United States Patent
Hirota et al.

(10) Patent No.: US 8,404,351 B2
(45) Date of Patent: Mar. 26, 2013

(54) INTERMEDIATE FILM FOR LAMINATED GLASS, AND LAMINATED GLASS

(75) Inventors: Etsurou Hirota, Shiga (JP); Juichi Fukatani, Shiga (JP); Manabu Matsumoto, Shiga (JP); Michio Shimamoto, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/202,597

(22) PCT Filed: Feb. 23, 2010

(86) PCT No.: PCT/JP2010/052748
§ 371 (c)(1),
(2), (4) Date: Oct. 11, 2011

(87) PCT Pub. No.: WO2010/095749
PCT Pub. Date: Aug. 26, 2010

(65) Prior Publication Data
US 2012/0021231 A1 Jan. 26, 2012

(30) Foreign Application Priority Data

Feb. 23, 2009 (JP) ................................. 2009-039807

(51) Int. Cl.
*B32B 17/10* (2006.01)
*B32B 27/08* (2006.01)
*B32B 27/42* (2006.01)
(52) U.S. Cl. .................... 428/437; 428/436; 428/525
(58) Field of Classification Search .................. 428/436, 428/437, 525
See application file for complete search history.

(56) References Cited

U.S. PATENT DOCUMENTS 5,340,654 A 8/1994 Ueda et al.
6,903,152 B2 * 6/2005 Toyama et al. ............... 524/403

FOREIGN PATENT DOCUMENTS

| JP | 6-000926 | 1/1994 |
| JP | 7-277783 | 10/1995 |
| JP | 2004-75501 | 3/2004 |
| JP | 2004-143008 | 5/2004 |
| JP | 2006-248826 | 9/2006 |

OTHER PUBLICATIONS

International Search Report issued Mar. 30, 2010 in International (PCT) Application No. PCT/JP2010/052748.

* cited by examiner

*Primary Examiner* — D. S. Nakarani
(74) *Attorney, Agent, or Firm* — Wenderoth, Lind & Ponack, L.L.P.

(57) ABSTRACT

An interlayer film for a laminated glass providing excellent overall sound insulation at temperatures in the range of from 10 to 60° C., which includes, a sound insulation layer 1; a middle layer; and a sound insulation layer 2, the layers each containing a polyvinyl acetal resin and a plasticizer and being laminated in the stated order, wherein the amount of the plasticizer per 100 parts by weight of the polyvinyl acetal resin in sound insulation layer 1 is different by from 5 to 60 parts by weight from the amount of the plasticizer per 100 parts by weight of the polyvinyl acetal resin in sound insulation layer 2, and the amounts of acetyl groups in the polyvinyl acetal resin contained in sound insulation layer 1 and sound insulation layer 2 each are larger than the amount of acetyl groups in the polyvinyl acetal resin contained in the middle layer.

14 Claims, No Drawings

INTERMEDIATE FILM FOR LAMINATED GLASS, AND LAMINATED GLASS

This application is a U.S. national stage of International Application No. PCT/JP2010/052748 filed Feb. 23, 2010.

TECHNICAL FIELD

The present invention relates to an interlayer film for a laminated glass, which provides excellent overall sound insulation at temperatures in the wide range of from 10 to 60° C.

BACKGROUND ART

A laminated glass is a safety glass which, even when broken by impact from the outside, shatters into few flying glass fragments. For this reason, a laminated glass is widely employed as the windowpanes of vehicles such as cars, aircrafts, buildings, and the like. Examples of a laminated glass include a laminated glass produced by interposing between at least a pair of glass plates an interlayer film for a laminated glass, which contains a plasticizer and a polyvinyl acetal resin such as a polyvinyl butyral resin.

In recent years, attempts have been made to reduce the thickness of laminated glasses in order to reduce the weight of the laminated glasses. However, reduction in the thickness of laminated glasses deteriorates the sound insulation. When such a laminated glass is used for the windshield of a car or the like, the sound insulation is insufficient against sounds such as wind noise and wiper noise which are at a frequency in an approximate range of from 2000 to 5000 Hz.

In view of such a sound insulation problem, Patent Document 1 for example discloses an interlayer film for a laminated glass having a middle layer, containing a polyvinyl acetal resin and a large amount of a plasticizer, sandwiched between two protective layers containing a small amount of a plasticizer and a polyvinyl acetal resin that contains acetyl groups in a small amount compared to the polyvinyl acetal resin contained in the middle layer. Such an interlayer film for a laminated glass is considered to provide high sound insulation.

The laminated glass obtained by using the interlayer film for a laminated glass described in Patent Document 1 indeed provides very high sound insulation in the normal temperature range around 25° C. However, cars and the like are used in an environment with temperatures usually in the wide range of from 10 to 60° C. Hence, the laminated glass obtained by using the interlayer film for a laminated glass according to Patent Document 1 provides insufficient overall sound insulation at temperatures in such a wide range.

PRIOR ART DOCUMENTS

Patent Documents

Patent Document 1: Japanese Kokai Publication 2004-075501 (JP-A 2004-075501)

SUMMARY OF THE INVENTION

Problems to be Solved by the Invention

The present invention aims to provide an interlayer film for a laminated glass providing excellent overall sound insulation at temperatures in the wide range of from 10 to 60° C.

Means for Solving the Problems

The present invention is an interlayer film for a laminated glass, including: a sound insulation layer 1; a middle layer; and a sound insulation layer 2, the layers each containing a polyvinyl acetal resin and a plasticizer and being laminated in the stated order, wherein the amount of the plasticizer per 100 parts by weight of the polyvinyl acetal resin in the sound insulation layer 1 is different by from 5 to 60 parts by weight from the amount of the plasticizer per 100 parts by weight of the polyvinyl acetal resin in the sound insulation layer 2, and the amounts of acetyl groups in the polyvinyl acetal resin contained in the sound insulation layer 1 and the sound insulation layer 2 each are larger than the amount of acetyl groups in the polyvinyl acetal resin contained in the middle layer.

The present invention is described in detail below.

The present inventors tried to ascertain the cause that the interlayer film for a laminated glass according to Patent Document 1 provides insufficient overall sound insulation for the wide temperature range. As a result, the present inventors found that the interlayer film for a laminated glass according to Patent Document 1 exhibits a trough of sound insulation between a peak of sound insulation achieved by the middle layer and a peak of sound insulation achieved by the protective layers, and provides insufficient sound insulation at temperatures in the range corresponding to the trough.

The present inventors also found, as a result of further ascertainment, that an interlayer film for a laminated glass can provide high sound insulation at temperatures in the wide range of from 10 to 60° C. when satisfying the following conditions: two sound insulation layers containing a polyvinyl acetal resin with a larger amount of acetyl groups than that in a polyvinyl acetal resin contained in a middle layer; and the sound insulation layers containing a plasticizer in amounts different from one another by a certain amount or more. However, when sound insulation layers having a large amount of the plasticizer are laminated, the plasticizer tends to be transferred in the direction which cancels the concentration difference of the plasticizer. To prevent this transfer, the middle layer containing the polyvinyl acetal resin, which contains a small amount of acetyl groups, is provided between the two sound insulation layers so that the plasticizer can be prevented from being transferred between the two sound insulation layers.

The interlayer film for a laminated glass according to the present invention has a sound insulation layer 1, a middle layer, and a sound insulation layer 2 laminated in the stated order.

The above sound insulation layer 1 and the sound insulation layer 2 each contain a polyvinyl acetal resin (hereinafter also referred to as a "polyvinyl acetal resin A") and a plasticizer.

The polyvinyl acetal resin A is not particularly limited, and a polyvinyl acetal resin containing acetal groups having 3 or 4 carbon atoms is preferable, and a polyvinyl acetal resin containing acetal groups having 3 or 4 carbon atoms and 30 mol % or less of acetyl groups, and having an average polymerization degree of from 500 to 5000 is more preferable.

The number of carbon atoms in the acetal group contained in the polyvinyl acetal resin A is preferably 3 or 4. That is, an aldehyde used in production of the polyvinyl acetal resin A is preferably an aldehyde having 3 or 4 carbon atoms. The number of carbon atoms of the acetal group contained in the polyvinyl acetal resin A of less than 3 may not result in sufficient sound insulation. Among the above examples of the polyvinyl acetal resin A, a polyvinyl butyral resin butyralized with n-butyl aldehyde having 4 carbon atoms is preferable.

Examples of the aldehyde having 3 or 4 carbon atoms include propionaldehyde, n-butyl aldehyde, and isobutyraldehyde. Among these, n-butyl aldehyde is suitable. Each of the above aldehydes may be used alone, or two or more of the aldehydes may be used in combination.

The upper limit of the amount of the acetyl groups in the polyvinyl acetal resin A is preferably 30 mol %. An amount of the acetyl groups in the polyvinyl acetal resin A of more than 30 mol % may significantly decrease reactivity between polyvinyl alcohol and an aldehyde, making it difficult to produce a polyvinyl acetal resin. The lower limit of the amount of the acetyl groups in the polyvinyl acetal resin A is preferably 3 mol %, the upper limit of the amount is more preferably 25 mol %, the lower limit of the amount is more preferably 6 mol %, and the upper limit of the amount is still more preferably 21 mol %.

The amount of the acetyl groups can be measured for example in accordance with JIS K 6728 "Testing Methods for Polyvinyl Butyral".

The lower limit of the average degree of polymerization of the polyvinyl acetal resin A is preferably 500, and the upper limit of the average degree is preferably 5000. An average degree of polymerization of the polyvinyl acetal resin A of less than 500 may decrease the penetration resistance of the laminated glass. An average degree of polymerization of the polyvinyl acetal resin A of more than 5000 may make it difficult to form the interlayer film for a laminated glass. The lower limit of the average degree of polymerization of the polyvinyl acetal resin A is more preferably 800, the upper limit of the average degree is more preferably 3000, the lower limit of the average degree is still more preferably 1500, and the upper limit of the average degree is still more preferably 2700.

The polyvinyl acetal resin A is produced by acetalizing polyvinyl alcohol with an aldehyde.

The polyvinyl alcohol is produced by saponifying polyvinyl acetate.

The lower limit of the degree of saponification of the polyvinyl alcohol is preferably 70 mol %, and the upper limit of the degree is preferably 99.8 mol %.

The lower limit of the average degree of polymerization of the polyvinyl alcohol is preferably 500, and the upper limit of the average degree is preferably 5000. An average degree of polymerization of the polyvinyl alcohol of less than 500 may decrease the penetration resistance of the laminated glass. An average degree of polymerization of the polyvinyl alcohol of more than 5000 may make it difficult to form the interlayer film for a laminated glass. The lower limit of the average degree of polymerization of the polyvinyl alcohol is more preferably 800, the upper limit of the average degree is more preferably 3000, the lower limit of the average degree is still more preferably 1500, and the upper limit of the average degree is still more preferably 2700.

The upper limit of the amount of hydroxyl groups in the polyvinyl acetal resin A is preferably 35 mol %. An amount of the hydroxyl groups in the polyvinyl acetal resin A of more than 35 mol % may make it difficult to form the interlayer film for a laminated glass. The lower limit of the amount of the hydroxyl groups of the polyvinyl acetal resin A is preferably 15 mol %, and the upper limit of the amount is more preferably 30 mol %.

The amount of the hydroxyl groups can be measured for example in accordance with JIS K 6728 "Testing Methods for Polyvinyl Butyral".

The above plasticizer is not particularly limited, and examples thereof include organic ester plasticizers such as monobasic organic acid esters and polybasic organic acid esters, and phosphoric acid plasticizers such as organic phosphoric acid plasticizers and organic phosphorous acid plasticizers.

The monobasic organic acid ester is not particularly limited, and examples thereof include glycol esters produced by reacting a glycol such as triethylene glycol, tetraethylene glycol, and tripropylene glycol, with a monobasic organic acid such as butyric acid, isobutyric acid, caproic acid, 2-ethylbutyric acid, heptylic acid, n-octylic acid, 2-ethylhexyl acid, pelargonic acid (n-nonylic acid), and decylic acid.

The polybasic organic acid ester is not particularly limited, and examples thereof include ester compounds of a polybasic organic acid such as adipic acid, sebacic acid, and azelaic acid, with a linear or branched alcohol having 4 to 8 carbon atoms.

The organic ester plasticizer is not particularly limited, and examples thereof include triethylene glycol di(2-ethyl butyrate), triethylene glycol di(2-ethylhexanoate), triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di(2-ethyl butyrate), 1,3-propylene glycol di(2-ethyl butyrate), 1,4-butylene glycol di(2-ethyl butyrate), diethylene glycol di(2-ethyl butyrate), diethylene glycol di-2-ethylhexanoate, dipropylene glycol di(2-ethyl butyrate), triethylene glycol di(2-ethyl pentanoate), tetraethylene glycol di(2-ethyl butyrate), diethylene glycol dicaprylate, tetraethylene glycol di-n-heptanoate, triethylene glycol di(2-ethyl butyrate), triethylene glycol diheptanoate, tetraethylene glycol diheptanoate, dihexyl adipate, dioctyl adipate, hexyl cyclohexyl adipate, diisononyl adipate, heptyl nonyl adipate, and dibutyl sebacate.

The organic phosphoric acid plasticizer is not particularly limited, and examples thereof include tributoxyethyl phosphate, isodecyl phenyl phosphate, and triisopropyl phosphate.

The above plasticizer is preferably at least one kind selected from the group consisting of dihexyl adipate (DHA), triethylene glycol di-2-ethylhexanoate (3GO), tetraethylene glycol di-2-ethylhexanoate (4GO), triethylene glycol di(2-ethyl butyrate) (3GH), tetraethylene glycol di(2-ethyl butyrate) (4GH), tetraethylene glycol di-n-heptanoate (4G7), and triethylene glycol di-n-heptanoate (3G7). Among these, since not being easily hydrolyzed, triethylene glycol di-2-ethylhexanoate (3GO), triethylene glycol di(2-ethyl butyrate) (3GH), tetraethylene glycol di-2-ethylhexanoate (4GO), and dihexyl adipate (DHA) are more preferable as the plasticizer, and triethylene glycol di-2-ethylhexanoate (3GO) is still more preferable.

The lower limit of the amount of the plasticizer in each of the sound insulation layer 1 and the sound insulation layer 2 is preferably 20 parts by weight, and the upper limit of the amount is preferably 90 parts by weight, per 100 parts by weight of the polyvinyl acetal resin A. An amount of the plasticizer in each of the sound insulation layer 1 and the sound insulation layer 2 of less than 20 parts by weight may make it difficult to form a laminate shape. On the other hand, an amount of more than 90 parts by weight may allow the plasticizer to bleed out or may make it difficult to handle the interlayer film. The upper limit of the amount of the plasticizer in each of the sound insulation layer 1 and the sound insulation layer 2 is more preferably 80 parts by weight, and the upper limit of the amount is still more preferably 70 parts by weight.

The amount of the plasticizer per 100 parts by weight of the polyvinyl acetal resin A in the sound insulation layer 1 is different by 5 parts by weight at the lower limit and 60 parts by weight at the upper limit from the amount of the plasticizer per 100 parts by weight of the polyvinyl acetal resin A in the sound insulation layer 2. When the amounts of the plasticizer in the sound insulation layers are different from one another in such a range, the interlayer film for a laminated glass can provide high overall sound insulation at temperatures in the wide range from 10 to 60° C. The amounts of the plasticizer are preferably different by 10 parts by weight at the lower limit, more preferably 20 parts by weight at the lower limit, and particularly preferably 30 parts by weight at the lower limit. The amounts of the plasticizer are preferably different by 55 parts by weight at the upper limit, and more preferably 50 parts by weight at the upper limit.

At least one of the amount of the plasticizer per 100 parts by weight of the polyvinyl acetal resin in the sound insulation layer 1 and the amount of the plasticizer per 100 parts by weight of the polyvinyl acetal resin in the sound insulation layer 2 is preferably larger than the amount of the plasticizer per 100 parts by weight of the polyvinyl acetal resin in the middle layer.

The middle layer contains a polyvinyl acetal resin (hereinafter also referred to as a "polyvinyl acetal resin B") and a plasticizer.

The polyvinyl acetal resin B is not particularly limited. A polyvinyl acetal resin containing acetal groups having 3 or 4 carbon atoms is preferable, and a polyvinyl acetal resin containing acetal groups having 3 or 4 carbon atoms and 10 mol % or less of acetyl groups, and having a degree of acetalization of 60 to 85 mol % is more preferable.

The number of carbon atoms in the acetal group contained in the polyvinyl acetal resin B is not particularly limited, and is preferably 3 or 4. That is, the aldehyde used in production of the polyvinyl acetal resin B is not particularly limited, and the same aldehyde as that used for the polyvinyl acetal resin A can be used. Among the examples of the polyvinyl acetal resin B, a polyvinyl butyral resin butyralized with n-butyl aldehyde having 4 carbon atoms is preferable.

The amount of the acetyl groups in the polyvinyl acetal resin B is less than the amount of the acetyl groups in the polyvinyl acetal resin A. If the amount of the acetyl groups in the polyvinyl acetal resin B is more than the amount of the acetyl groups in the polyvinyl acetal resin A, the plasticizer tends to be transferred from the sound insulation layer 1 and the sound insulation layer 2 to the middle layer. As a result, the difference between the amounts of the plasticizer in the sound insulation layer 1 and the sound insulation layer 2 cannot be maintained.

The present invention satisfies a requirement 1 that the amounts of the acetyl groups in the polyvinyl acetal resin contained in the sound insulation layers each are larger than the amount of the acetyl groups in the polyvinyl acetal resin contained in the middle layer. The requirement 1 leads to the difference between the positions of the peaks of sound insulation achieved by the sound insulation layers and the peak of sound insulation achieved by the middle layer even when the amounts of the plasticizer per 100 parts by weight of the polyvinyl acetal resin in the respective sound insulation layers are the same as the amount of the plasticizer per 100 parts by weight of the polyvinyl acetal resin in the middle layer.

The present invention satisfies a requirement 2 that the amount of the plasticizer per 100 parts by weight of the polyvinyl acetal resin in the sound insulation layer 1 is different by from 5 to 60 parts by weight from the amount of the plasticizer per 100 parts by weight of the polyvinyl acetal resin in the sound insulation layer 2. The requirement 2 leads to the difference between the positions of the peak of sound insulation achieved by the sound insulation layer 1 and the peak of sound insulation achieved by the sound insulation layer 2.

The interlayer film for a laminated glass according to the present invention, satisfying the requirement 1 and the requirement 2, can attain the peaks of sound insulation achieved by the respective sound insulation layer 1, sound insulation layer 2, and middle layer, thereby providing excellent overall sound insulation at temperatures in the wide range of from 10 to 60° C.

Further, even if the peaks of sound insulation achieved by the respective sound insulation layer 1, sound insulation layer 2, and middle layer overlap, the absolute level of sound insulation increases. This makes it possible to attain an interlayer film for a laminated glass excellent in the overall sound insulation at temperatures in the wide range of from 10 to 60° C.

Although the difference between the amount of the acetyl groups in the polyvinyl acetal resin B and the amount of the acetyl groups in the polyvinyl acetal resin A is not particularly limited, the lower limit of the difference is preferably 5 mol %, and is more preferably 10 mol %. The upper limit of the difference between the amount of the acetyl groups in the polyvinyl acetal resin B and the amount of the acetyl groups in the polyvinyl acetal resin A is not particularly limited, and the upper limit of the difference is preferably 30 mol %, and is more preferably 20 mol %.

The amount of the acetyl groups in the polyvinyl acetal resin B is preferably 10 mol % or less. An amount of the acetyl groups of more than 10 mol % may not result in sufficient strength of the interlayer film for a laminated glass. The upper limit of the amount of the acetyl groups is more preferably 8 mol %, is still more preferably 6 mol %, and is particularly preferably 1 mol %.

The amount of the acetyl groups can be measured for example in accordance with JIS K 6728 "Testing Methods for Polyvinyl Butyral".

The lower limit of the degree of acetalization of the polyvinyl acetal resin B is preferably 60 mol %, and the upper limit of the degree is preferably 85 mol %. A polyvinyl acetal resin with a degree of acetalization in the range of from 60 to 85 mol % has low compatibility with a plasticizer. Use of such a polyvinyl acetal resin as the polyvinyl acetal resin B in the middle layer allows prevention of the plasticizer from being transferred from the sound insulation layer 1 and the sound insulation layer 2 to the middle layer. As a result, the difference in the amounts of the plasticizer in the sound insulation layer 1 and the sound insulation layer 2 can be maintained. A degree of acetalization of the polyvinyl acetal resin B of less than 60 mol % may decrease moisture resistance of the middle layer. A degree of acetalization of the polyvinyl acetal resin B of more than 85 mol % may result in transfer of the plasticizer contained in the sound insulation layer 1 and the sound insulation layer 2 to the middle layer. The lower limit of the degree of acetalization of the polyvinyl acetal resin B is more preferably 62 mol %, the upper limit of the degree is more preferably 80 mol %, the lower limit of the degree is still more preferably 65 mol %, and the upper limit of the degree is still more preferably 75 mol %.

The degree of acetalization can be measured for example in accordance with JIS K 6728 "Testing Methods for Polyvinyl Butyral".

The polyvinyl acetal resin B is produced by acetalizing polyvinyl alcohol with an aldehyde.

The polyvinyl alcohol is produced by saponifying polyvinyl acetate.

The lower limit of the degree of saponification of the polyvinyl alcohol is preferably 90 mol %, and the upper limit of the degree is preferably 99.8 mol %.

The lower limit of the average degree of polymerization of the polyvinyl alcohol is preferably 500, and the upper limit of the average degree is preferably 5000. An average degree of polymerization of the polyvinyl alcohol of less than 500 may decrease the penetration resistance of the laminated glass. An average degree of polymerization of the polyvinyl alcohol of more than 5000 may make it difficult to form the interlayer film for a laminated glass. The lower limit of the average degree of polymerization of the polyvinyl alcohol is more preferably 800, the upper limit of the average degree is more preferably 3000, the lower limit of the average degree is still more preferably 1500, and the upper limit of the average degree is still more preferably 2700.

The above plasticizers for the sound insulation layer 1 and the sound insulation layer 2 can be used as the plasticizer for the middle layer. The plasticizer for the middle layer may be the same as or different from the plasticizer for the sound insulation layer 1 and the sound insulation layer 2.

The lower limit of the amount of the plasticizer in the middle layer per 100 parts by weight of the polyvinyl acetal resin B is preferably 25 parts by weight, and the upper limit of the amount is preferably 50 parts by weight. An amount of the plasticizer in the middle layer of less than 25 parts by weight may significantly decrease the penetration resistance of the laminated glass. An amount of the plasticizer in the middle layer of more than 50 parts by weight may result in transfer of the plasticizer from the middle layer to the sound insulation layer 1 and the sound insulation layer 2. The lower limit of the amount of the plasticizer in the middle layer is more preferably 30 parts by weight, and the upper limit of the amount is more preferably 40 parts by weight.

The interlayer film for a laminated glass of the present invention may be any laminate having at least the sound insulation layer 1, the middle layer, and the sound insulation layer 2 laminated in the stated order, and may further have an additional resin layer either or both of between the middle layer and the sound insulation layer 1 and between the middle layer and the sound insulation layers 2, or on either or both of the outer side of the sound insulation layer 1 and the outer side of the sound insulation layer 2.

A particularly preferable example is that a surface protective layer 1 and a surface protective layer 2 are provided on the respective outer sides of the sound insulation layer 1 and the sound insulation layer 2 in order to improve the penetration resistance of the interlayer film for a laminated glass according to the present invention, and to prevent the plasticizer from bleeding out from the sound insulation layer 1 and the sound insulation layer 2.

An interlayer film for a laminated glass, which has the surface protective layer 1 on the sound insulation layer 1 on the side opposite to the middle layer, is one aspect of the present invention.

An interlayer film for a laminated glass, which has the surface protective layer 2 on the sound insulation layer 2 on the side opposite to the middle layer, is another aspect of the present invention.

An interlayer film for a laminated glass, which has the surface protective layer 1 on the sound insulation layer 1 on the side opposite to the middle layer and has the surface protective layer 2 on the sound insulation layer 2 on the side opposite to the middle layer, is yet another aspect of the present invention.

The surface protective layer 1 and the surface protective layer 2 each preferably contain a polyvinyl acetal resin (hereinafter also referred to as a "polyvinyl acetal resin C") and a plasticizer.

The polyvinyl acetal resin C is not particularly limited, and a polyvinyl acetal resin containing acetal groups having 3 or 4 carbon atoms is preferable, and a polyvinyl acetal resin containing acetal groups having 3 or 4 carbon atoms and 10 mol % or less of acetyl groups, and having a degree of acetalization of from 60 to 85 mol % is more preferable.

The number of carbon atoms in the acetal group contained in the polyvinyl acetal resin C is not particularly limited, and is preferably 3 or 4. That is, an aldehyde used in production of the polyvinyl acetal resin C is not particularly limited, and the same aldehyde as that used for the polyvinyl acetal resin A can be used. The polyvinyl acetal resin C is preferably a polyvinyl butyral resin butyralized with n-butyl aldehyde having 4 carbon atoms.

The amount of the acetyl groups in the polyvinyl acetal resin C is preferably less than the amount of the acetyl groups in the polyvinyl acetal resin A. If the amount of the acetyl groups in the polyvinyl acetal resin C is more than the amount of the acetyl groups in the polyvinyl acetal resin A, the plasticizer tends to be transferred from the sound insulation layers to the surface protective layers. As a result, the difference between the amounts of the plasticizer in the sound insulation layer 1 and the sound insulation layer 2 may not be maintained.

The lower limit of the difference between the amount of the acetyl groups in the polyvinyl acetal resin C and the amount of the acetyl groups in the polyvinyl acetal resin A is preferably 5 mol %, is more preferably 10 mol %, and is still more preferably 12 mol %. The upper limit of the difference in the amount of the acetyl groups in the polyvinyl acetal resin C and the amount of the acetyl groups in the polyvinyl acetal resin A is preferably 30 mol %, and is more preferably 20 mol %.

The polyvinyl acetal resin C preferably contains 10 mol % or less of the acetyl groups. An amount of the acetyl groups in the polyvinyl acetal resin C of more than 10 mol % may not provide sufficient penetration resistance to the interlayer film for a laminated glass. The upper limit of the amount of the acetyl groups in the polyvinyl acetal resin C is more preferably 8 mol %, is still more preferably 6 mol %, and is particularly preferably 1 mol %.

The amount of the acetyl groups can be measured for example in accordance with JIS K 6728 "Testing Methods for Polyvinyl Butyral".

The lower limit of the degree of acetalization of the polyvinyl acetal resin C is preferably 60 mol %, and the upper limit of the degree is preferably 85 mol %. A polyvinyl acetal resin with a degree of acetalization in the range of from 60 to 85 mol % has low compatibility with a plasticizer. Use of such a polyvinyl acetal resin as the polyvinyl acetal resin C in the surface protective layers allows prevention of the plasticizer from being transferred from the sound insulation layers to the surface protective layers. As a result, the difference in the amounts of the plasticizer in the sound insulation layer 1 and the sound insulation layer 2 can be maintained. A degree of acetalization of the polyvinyl acetal resin C of less than 60 mol % may decrease moisture resistance of the surface protective layers. A degree of acetalization of the polyvinyl acetal resin C of more than 85 mol % may result in transfer of the plasticizer contained in the sound insulation layers to the surface protective layers. The lower limit of the degree of acetalization of the polyvinyl acetal resin C is more preferably 62 mol %, the upper limit of the degree is more preferably 80 mol %, the lower limit of the degree is still more preferably 65 mol %, and the upper limit of the degree is still more preferably 75 mol %.

The degree of acetalization can be measured for example in accordance with JIS K 6728 "Testing Methods for Polyvinyl Butyral".

The lower limit of the amount of hydroxyl groups in the polyvinyl acetal resin C is preferably 20 mol %, and the upper limit of the amount is preferably 35 mol %. An amount of the hydroxyl groups in the polyvinyl acetal resin C of less than 20 mol % may decrease adhesive strength of the interlayer film for a laminated glass to transparent plates. An amount of the hydroxyl groups of more than 35 mol % may make it difficult to form the interlayer film for a laminated glass. The lower limit of the amount of the hydroxyl groups in the polyvinyl acetal resin C is more preferably 25 mol %, and the upper limit of the amount is more preferably 34 mol %.

The amount of the hydroxyl groups can be measured for example in accordance with JIS K 6728 "Testing Methods for Polyvinyl Butyral".

The polyvinyl acetal resin C is produced by acetalizing polyvinyl alcohol with an aldehyde.

The polyvinyl alcohol is produced by saponifying polyvinyl acetate.

The lower limit of the degree of saponification of the polyvinyl alcohol is preferably 90 mol %, and the upper limit of the degree is preferably 99.8 mol %.

The plasticizers used for the sound insulation layers can be used as the plasticizer for the surface protective layers. The plasticizer for the surface protective layers may be the same as or different from the plasticizer for the sound insulation layers. The plasticizers are preferably the same in consideration of making it easier to adjust sound insulation of the interlayer film for a laminated glass.

The lower limit of the amount of the plasticizer in each of the surface protective layer 1 and the surface protective layer 2 per 100 parts by weight of the polyvinyl acetal resin C is preferably 25 parts by weight, and the upper limit of the amount is preferably 50 parts by weight. An amount of the plasticizer in each surface protective layer of less than 25 parts by weight may significantly decrease the penetration resistance of the laminated glass. An amount of the plasticizer in each surface protective layer of more than 50 parts by weight may result in transfer of the plasticizer from the surface protective layers to the sound insulation layers. The lower limit of the amount of the plasticizer in each surface protective layer is more preferably 30 parts by weight, and the upper limit of the amount is more preferably 40 parts by weight.

When the amount of the plasticizer in each surface protective layer is less than the amount of the plasticizer in each sound insulation layer, handling of the interlayer film for a laminated glass according to the present invention is made easy.

The sound insulation layer 1, the sound insulation layer 2, the middle layer, the surface protective layer 1, and the surface protective layer 2 each may, according to need, contain additives such as a dispersing agent, an antioxidant, a light stabilizer, a flame retardant, an antistatic agent, an adhesion regulator, a moisture resistant agent, a heat ray reflector, a heat ray absorbent, a fluorescent bleach, and a blue pigment.

The lower limit of the thickness of the interlayer film for a laminated glass according to the present invention is preferably 300 μm, and the upper limit of the thickness is preferably 2000 μm. A thickness of the interlayer film for a laminated glass according to the present invention of less than 300 μm may not achieve sufficient penetration resistance. A thickness of the interlayer film for a laminated glass according to the present invention of more than 2000 μm may provide a laminated glass with a thickness exceeding the thickness of laminated glasses in practical use. The lower limit of the thickness of the interlayer film for a laminated glass according to the present invention is more preferably 400 μm, and the upper limit of the thickness is more preferably 1200 μm.

The lower limit of the thickness of each of the sound insulation layer 1 and the sound insulation layer 2 is preferably 50 μm, and the upper limit of the thickness is preferably 300 μm. A thickness of each of the sound insulation layer 1 and the sound insulation layer 2 of less than 50 μm may not provide a sound insulation layer with a uniform thickness. A thickness of each of the sound insulation layer 1 and the sound insulation layer 2 of more than 300 μm may lead to an increase in the thickness of the whole interlayer film for a laminated glass, which would be impractical. The lower limit of the thickness of each of the sound insulation layer 1 and the sound insulation layer 2 is more preferably 80 μm and is still more preferably 100 μm, and the upper limit of the thickness is more preferably 250 μm.

The lower limit of the thickness of the middle layer is preferably 50 μm, and the upper limit of the thickness is preferably 1400 μm. A thickness of the middle layer of less than 50 μm may not lead to good prevention of the transfer of the plasticizer in the sound insulation layer 1 and the sound insulation layer 2. As a result, the difference in the amounts of the plasticizer in the sound insulation layer 1 and the sound insulation layer 2 may not be maintained. A thickness of the middle layer of more than 1400 μm may result in an increase in the thickness of the whole interlayer film for a laminated glass, which would be impractical. The lower limit of the thickness of the middle layer is more preferably 80 μm and still more preferably 100 μm, and the upper limit of the thickness is more preferably 700 μm.

The lower limit of the thickness of each of the surface protective layer 1 and the surface protective layer 2 is preferably 200 μm, and the upper limit of the thickness is preferably 1400 μm. A thickness of each of the surface protective layer 1 and the surface protective layer 2 of less than 200 μm may not lead to sufficient improvement in penetration resistance, and to good prevention of the plasticizer from bleeding out from the sound insulation layer 1 and the sound insulation layer 2. A thickness of each of the surface protective layer 1 and the surface protective layer 2 of more than 1400 μm may result in an increase in the thickness of the whole interlayer film for a laminated glass, which would be impractical. The lower limit of the thickness of each of the surface protective layer 1 and the surface protective layer 2 is more preferably 300 μm, and the upper limit of the thickness is more preferably 700 μm.

The method of producing the interlayer film for a laminated glass according to the present invention is not particularly limited, and examples thereof include a method including the following processes: a process of press-molding each of a resin composition constituting the middle layer, a resin composition constituting the sound insulation layer 1, and a resin composition constituting the sound insulation layer 2 into a sheet; a process of sandwiching the sheet formed of the resin composition constituting the middle layer between the sheet formed of the resin composition constituting the sound insulation layer 1 and the sheet formed of the resin composition constituting the sound insulation layer 2 such that a laminate is produced; and a process of press-molding the laminate.

The examples of the method of producing the interlayer film for a laminated glass according to the present invention also include a method of co-extruding with an extruder the resin composition constituting the middle layer, the resin composition constituting the sound insulation layer 1, and the resin composition constituting the sound insulation layer 2.

A laminated glass, which has the interlayer film for a laminated glass according to the present invention sandwiched between two transparent plates, is yet another aspect of the present invention. The laminated glass of the present invention may be used as a part of double-glazed glass. The transparent plates used for the laminated glass of the present invention are not particularly limited, and generally used transparent plate glasses can be employed. Examples thereof include inorganic glasses such as float plate glass, polished plate glass, molded plate glass, meshed plate glass, wired plate glass, colored plate glass, heat ray absorbing glass, heat reflecting glass, and green glass. Also, organic plastic plates such as polycarbonate plates and polyacrylate plates can be used.

Two or more kinds of plate glasses may be used for the above plate glass. Examples of the laminated glass of the present invention include a laminated glass produced by sandwiching the interlayer film for a laminated glass according to the present invention between transparent float plate glass and colored plate glass such as green glass. The examples of the laminated glass further include a laminated glass produced by sandwiching the interlayer film for a laminated glass according to the present invention between an inorganic glass and an organic plastic plate.

The laminated glass of the present invention can be used for windshields, side glass, rear glass, roof glass, and panorama glass of cars.

The method of producing the laminated glass according to the present invention is not particularly limited, and can be a known production method.

Effect of the Invention

The present invention can provide an interlayer film for a laminated glass, which provides excellent overall sound insulation at temperatures in the wide range of from Mode for Carrying out the Invention The aspects of the present invention are described below in more detail based on Examples. The present invention is not limited to the Examples.

EXAMPLE 1

(1) Preparation of Resin Composition 1 Constituting Sound Insulation Layer 1

First, 30 parts by weight of triethylene glycol di-2-ethylhexanoate (3GO) as a plasticizer was added to 100 parts by weight of a polyvinyl butyral resin (average degree of polymerization: 2100) containing acetal groups having 4 carbon atoms and 13 mol % of acetyl groups, and having a degree of butyralization of 65 mol %. Then, they were sufficiently mixed and kneaded with a roll mill. Thereby, a resin composition 1 was prepared.

(2) Preparation of Resin Composition 2 Constituting Sound Insulation Layer 2

First, 60 parts by weight of triethylene glycol di-2-ethylhexanoate (3GO) as a plasticizer was added to 100 parts by weight of a polyvinyl butyral resin (average degree of polymerization: 2100) containing acetal groups having 4 carbon atoms and 13 mol % of acetyl groups, and having a degree of butyralization of 65 mol %. Then, they were sufficiently mixed and kneaded with a roll mill. Thereby, a resin composition 2 was prepared.

(3) Preparation of Resin Composition 3 Constituting Middle Layer

First, 40 parts by weight of triethylene glycol di-2-ethylhexanoate (3GO) as a plasticizer was added to 100 parts by weight of a polyvinyl butyral resin (average degree of polymerization: 1700) containing acetal groups having 4 carbon atoms and 1 mol % of acetyl groups, and having a degree of butyralization of 65 mol %. Then, they were sufficiently mixed and kneaded with a roll mill. Thereby, a resin composition 3 was prepared.

(4) Production of Interlayer Film for Laminated Glass

The resin composition 1 was sandwiched with 100-μm clearance plates between two Teflon (registered trademark) sheets, and they were press-molded at 150° C. such that a 100-μm-thick sound insulation layer 1 was produced.

The resin composition 2 was sandwiched with 100-μm clearance plates between two Teflon (registered trademark) sheets, and they were press-molded at 150° C. such that a 100-μm-thick sound insulation layer 2 was produced.

The resin composition 3 was sandwiched with 600-μm clearance plates between two Teflon (registered trademark) sheets, and they were press-molded at 150° C. such that a 600-μm-thick middle layer was produced.

A laminate was prepared by laminating the sound insulation layer 1, the middle layer, and the sound insulation layer 2 in the stated order. The laminate was sandwiched with 800-μm clearance plates between two Teflon (registered trademark) sheets, and they were press-molded at 150° C. such that an 800-μm-thick interlayer film for a laminated glass was produced.

(5) Production of Laminated Glass

The interlayer film for a laminated glass produced thereby was sandwiched by two transparent float glass plates (30 cm in length×30 cm in width×2.5 mm in thickness). The laminate was placed in a rubber bag and the rubber bag was deaerated for 20 minutes at a vacuum of 2.6 kPa. Then, the laminate was vacuum-pressed for 30 minutes at 90° C. This preliminarily pressure-bonded laminated glass was pressure-bonded in an autoclave for 20 minutes at 135° C. with a pressure of 1.2 MPa to produce a laminated glass.

EXAMPLES 2 TO 4, COMPARATIVE EXAMPLES 1 and 2

An interlayer film for a laminated glass and a laminated glass were produced by the same procedure as that in Example 1, except that the amount of the plasticizer was changed to the value shown in Table 1.

COMPARATIVE EXAMPLE 3

An interlayer film for a laminated glass and a laminated glass were produced by the same procedure as that in Example 1, except that the sound insulation layer 1 and the sound insulation layer 2 each were formed from the resin composition 3, the middle layer was formed from the resin composition 1, and the amount of the plasticizer was changed to the value shown in Table 2.

The thickness of each of the sound insulation layer 1 and the sound insulation layer 2 was set to 350 μm, and the thickness of the middle layer was set to 100 μm.

COMPARATIVE EXAMPLE 4

An interlayer film for a laminated glass and a laminated glass were produced by the same procedure as that in Comparative Example 3, except that the amount of the plasticizer was changed to the value shown in Table 2.

EXAMPLES 5 TO 42, COMPARATIVE EXAMPLES 5 to 8

An interlayer film for a laminated glass and a laminated glass were produced by the same procedure as that in Example 1, except that the resin compositions constituting the respective sound insulation layer 1, sound insulation layer 2, and middle layer each were changed as shown in Tables 3 to 10.

EXAMPLE 43

(1) Preparation of Resin Composition 43-1 Constituting Sound Insulation Layer 1

First, 55 parts by weight of triethylene glycol di-2-ethylhexanoate (3GO) as a plasticizer was added to 100 parts by weight of a polyvinyl butyral resin (average degree of polymerization: 2300) containing acetal groups having 4 carbon atoms and 6 mol % of acetyl groups, and having a degree of butyralization of 70 mol %. Then, they were sufficiently mixed and kneaded with a roll mill. Thereby, a resin composition 43-1 was prepared.

(2) Preparation of Resin Composition 43-2 Constituting Sound Insulation Layer 2

First, 60 parts by weight of triethylene glycol di-2-ethylhexanoate (3GO) as a plasticizer was added to 100 parts by weight of a polyvinyl butyral resin (average degree of polymerization: 2100) containing acetal groups having 4 carbon atoms and 13 mol % of acetyl groups, and having a degree of butyralization of 65 mol %. Then, they were sufficiently mixed and kneaded with a roll mill. Thereby, a resin composition 43-2 was prepared.

(3) Preparation of Resin Composition 43-3 Constituting Middle Layer

First, 40 parts by weight of triethylene glycol di-2-ethylhexanoate (3GO) as a plasticizer was added to 100 parts by weight of a polyvinyl butyral resin (average degree of polymerization: 1700) containing acetal groups having 4 carbon atoms and 1 mol % of acetyl groups, and having a degree of butyralization of 65 mol %. Then, they were sufficiently mixed and kneaded with a roll mill. Thereby, a resin composition 43-3 was prepared.

(4) Preparation of Resin Composition 43-4 Constituting Surface Protective Layer 1

First, 38 parts by weight of triethylene glycol di-2-ethylhexanoate (3GO) as a plasticizer was added to 100 parts by weight of a polyvinyl butyral resin (average degree of polymerization: 1700) containing acetal groups having 4 carbon atoms and 1 mol % of acetyl groups, and having a degree of butyralization of 65 mol %. Then, they were sufficiently mixed and kneaded with a roll mill. Thereby, a resin composition 43-4 was prepared.

(5) Preparation of Resin Composition 43-5 Constituting Surface Protective Layer 2

First, 38 parts by weight of triethylene glycol di-2-ethylhexanoate (3GO) as a plasticizer was added to 100 parts by weight of a polyvinyl butyral resin (average degree of polymerization: 1700) containing acetal groups having 4 carbon atoms and 1 mol % of acetyl groups, and having a degree of butyralization of 65 mol %. Then, they were sufficiently mixed and kneaded with a roll mill. Thereby, a resin composition 43-5 was prepared.

(6) Production of Interlayer Film for Laminated Glass

The resin composition 43-1 was sandwiched with 100-μm clearance plates between two Teflon (registered trademark) sheets, and they were press-molded at 150° C. such that a 100-μm-thick sound insulation layer 1 was produced.

The resin composition 43-2 was sandwiched with 100-μm clearance plates between two Teflon (registered trademark) sheets, and they were press-molded at 150° C. such that a 100-μm-thick sound insulation layer 2 was produced.

The resin composition 43-3 was sandwiched with 100-μm clearance plates between two Teflon (registered trademark) sheets, and they were press-molded at 150° C. such that a 100-μm-thick middle layer was produced.

The resin composition 43-4 was sandwiched with 300-μm clearance plates between two Teflon (registered trademark) sheets, and they were press-molded at 150° C. such that a 300-μm-thick surface protective layer 1 was produced.

The resin composition 43-5 was sandwiched with 300-μm clearance plates between two Teflon (registered trademark) sheets, and they were press-molded at 150° C. such that a 300-μm-thick surface protective layer 2 was produced.

A laminate was prepared by laminating the surface protective layer 1, the sound insulation layer 1, the middle layer, the sound insulation layer 2, and the surface protective layer 2 in the stated order. The laminate was sandwiched with 900-μm clearance plates between two Teflon (registered trademark) sheets, and they were press-molded at 150° C. such that a 900-μm-thick interlayer film for a laminated glass was produced.

(7) Production of Laminated Glass

The interlayer film for a laminated glass produced thereby was sandwiched by two transparent float glass plates (30 cm in length×30 cm in width×2.5 mm in thickness). The laminate was placed in a rubber bag and the rubber bag was deaerated for 20 minutes at a vacuum of 2.6 kPa. Then, the laminate was vacuum-pressed for 30 minutes at 90° C. This preliminarily pressure-bonded laminated glass was pressure-bonded in an autoclave for 20 minutes at 135° C. with a pressure of 1.2 MPa to produce a laminated glass.

EXAMPLES 44 TO 50

An interlayer film for a laminated glass and a laminated glass were produced by the same procedure as that in Example 43, except that the resin compositions constituting the respective surface protective layer 1, sound insulation layer 1, middle layer, sound insulation layer 2, and surface protective layer 2 each were changed as shown in Tables 12 to 14.

(Evaluation)

The laminated glasses produced in Examples and Comparative Examples were evaluated on the following criteria. Tables 1 to 14 show the results.

(Evaluation of Sound Insulation)

Evaluation samples each with a size of 25 mm (length)× 300 mm (width) were cut out from each laminated glass. Each evaluation sample was allowed to stand for ten minutes in a constant-temperature bath at 10° C., 20° C., 30° C., 40° C., 50° C., or 60° C. Then, each evaluation sample was vibrated by a vibration generator for damping tests ("G21-005D", product of Shinkensha Co., Ltd.) in the constant-temperature bath. The resulting vibration characteristics were amplified by a mechanical impedance amplifier ("XG-81", product of Rion Co., Ltd.), and the vibrational spectrum was analyzed by an FFT spectrum analyzer ("FFT Spectrum Analyzer HP 3582A", product of Yokogawa Hewlett Packard Ltd.). Thereby, the loss factor of peaks in the frequency range of from 2000 to 3000 Hz was determined. The larger the loss factor, the better the sound insulation.

The average value of the loss factors determined at the respective temperatures was calculated to evaluate each laminated glass on the sound insulation. The average value equal to or more than 0.25 was evaluated as "○", and the average value less than 0.25 was evaluated as "×".

(Evaluation of Penetration Resistance)

The surface temperature of the laminated glass (30 cm in length×30 cm in width) was adjusted to 23° C. Subsequently, according to JIS R 3212, a rigid sphere having a mass of 2260 g and a diameter of 82 mm was dropped from a height of 4 m on the center of the laminated glass. Six sheets of the laminated glass in total were tested in the same way, and the laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. If four sheets of the laminated glass prevented the rigid sphere from penetrating therethrough within five seconds after the rigid sphere hit the sheets, another six sheets of the laminated glass were tested again on the penetration resistance. If five sheets of the laminated glass prevented the rigid sphere from penetrating therethrough within five seconds after the rigid sphere hit the sheets, another sheet of the laminated glass was tested. The glass was considered to have passed the test if the other sheet prevented the rigid sphere from penetrating therethrough within five seconds after the rigid sphere hit the sheet. The same penetration resistance test was performed also from the drop height of 5 m.

The laminated glass having passed the tests with the drop heights of 4 m and 5 m was evaluated as "⊚", and the laminated glass having passed the test with the drop height of 4 m only was evaluated as "○".

(Evaluation of Bleed Out)

A piece with a size of 100 mm (length)×100 mm (width) was cut out from the interlayer film for a laminated glass. Meanwhile, 100-μm-thick PET films (100 mm in length×100 mm in width) after release processing, and transparent float glass sheets (100 mm in length×100 mm in width) were prepared. They were laminated in the order of a glass sheet, a PET film, the interlayer film for a laminated glass, a PET film, and a glass sheet. The laminate was allowed to stand for 30 minutes at 90° C. in a vacuum laminator and then vacuum-pressed. Thereafter, the glass sheets and the PET films were removed to leave the interlayer film for a laminated glass. On the surface of the interlayer film for a laminated glass, five 8-cm lines were drawn with a permanent marker at 23° C. The interlayer film for a laminated glass was allowed to stand for four weeks at 23° C. The interlayer film for a laminated glass had been observed visually. The interlayer film was evaluated as "⊚" if no line bled after four weeks of standing. The interlayer film was evaluated as "○" if no line bled after three weeks of standing but at least one line bled after four weeks of standing.

TABLE 1

|  |  | Example 1 | Example 2 | Example 3 | Example 4 | Comparative Example 1 | Comparative Example 2 |
|---|---|---|---|---|---|---|---|
| Composition of sound insulation layer 1 | Polyvinyl butyral resin (Amount of acetyl groups: 13 mol %, degree of butyralization: 65 mol %, average degree of polymerization: 2100) | 100 | 100 | 100 | 100 | 100 | 100 |
|  | Plasticizer (3GO) | 30 | 20 | 80 | 45 | 43 | 94 |
| Composition of middle layer | Polyvinyl butyral resin (Amount of acetyl groups: 1 mol %, degree of butyralization: 65 mol %, average degree of polymerization: 1700) | 100 | 100 | 100 | 100 | 100 | 100 |
|  | Plasticizer (3GO) | 40 | 40 | 40 | 40 | 40 | 40 |
| Composition of sound insulation layer 2 | Polyvinyl butyral resin (Amount of acetyl groups: 13 mol %, degree of butyralization: 65 mol %, average degree of polymerization: 2100) | 100 | 100 | 100 | 100 | 100 | 100 |
|  | Plasticizer (3GO) | 60 | 60 | 20 | 40 | 40 | 30 |
| Difference in amount of acetyl groups in polyvinyl acetal resin in sound insulation layer 1 and middle layer (mol %) | | 12 | 12 | 12 | 12 | 12 | 12 |
| Difference in amount of acetyl groups in polyvinyl acetal resin in sound insulation layer 2 and middle layer (mol %) | | 12 | 12 | 12 | 12 | 12 | 12 |
| Difference in amount of plasticizer in sound insulation layer 1 and sound insulation layer 2 (parts by weight) | | 30 | 40 | 60 | 5 | 3 | 64 |
| Evaluation Sound insulation | Loss factor 10° C. | 0.18 | 0.19 | 0.42 | 0.20 | 0.20 | 0.43 |
|  | 20° C. | 0.51 | 0.47 | 0.37 | 0.25 | 0.23 | 0.32 |
|  | 30° C. | 0.39 | 0.37 | 0.25 | 0.32 | 0.33 | 0.21 |
|  | 40° C. | 0.30 | 0.32 | 0.26 | 0.31 | 0.25 | 0.24 |
|  | 50° C. | 0.11 | 0.17 | 0.15 | 0.24 | 0.24 | 0.15 |

TABLE 1-continued

|  |  | Example 1 | Example 2 | Example 3 | Example 4 | Comparative Example 1 | Comparative Example 2 |
|---|---|---|---|---|---|---|---|
|  | 60° C. | 0.10 | 0.10 | 0.10 | 0.20 | 0.20 | 0.10 |
|  | Average | 0.265 | 0.270 | 0.258 | 0.253 | 0.242 | 0.242 |
| Evaluation |  | ○ | ○ | ○ | ○ | X | X |
| Evaluation of penetration resistance |  | ○ | ○ | ○ | ○ | ○ | ○ |
| Evaluation of bleed out |  | ○ | ○ | ○ | ○ | ○ | ○ |

TABLE 2

|  |  |  | Comparative Example 3 | Comparative Example 4 |
|---|---|---|---|---|
| Composition of sound insulation layer 1 | Polyvinyl butyral resin (Amount of acetyl groups: 1 mol %, degree of butyralization: 65 mol %, average degree of polymerization: 1700) |  | 100 | 100 |
|  | Plasticizer (3GO) |  | 40 | 40 |
| Composition of middle layer | Polyvinyl butyral resin (Amount of acetyl groups: 13 mol %, degree of butyralization: 65 mol %, average degree of polymerization: 2100) |  | 100 | 100 |
|  | Plasticizer (3GO) |  | 60 | 60 |
| Composition of sound insulation layer 2 | Polyvinyl butyral resin (Amount of acetyl groups: 1 mol %, degree of butyralization: 65 mol %, average degree of polymerization: 1700) |  | 100 | 100 |
|  | Plasticizer (3GO) |  | 40 | 45 |
| Difference in amount of acetyl groups in polyvinyl acetal resin in sound insulation layer 1 and middle layer (mol %) |  |  | 12 | 12 |
| Difference in amount of acetyl groups in polyvinyl acetal resin in sound insulation layer 2 and middle layer (mol %) |  |  | 12 | 12 |
| Difference in amount of plasticizer in sound insulation layer 1 and sound insulation layer 2 (parts by weight) |  |  | 0 | 5 |
| Evaluation | Sound insulation | Loss factor | 10° C. | 0.09 | 0.12 |
|  |  |  | 20° C. | 0.26 | 0.24 |
|  |  |  | 30° C. | 0.27 | 0.26 |
|  |  |  | 40° C. | 0.21 | 0.22 |
|  |  |  | 50° C. | 0.24 | 0.21 |
|  |  |  | 60° C. | 0.14 | 0.13 |
|  |  |  | Average | 0.202 | 0.197 |
|  | Evaluation |  |  | X | X |
|  | Evaluation of penetration resistance |  |  | ○ | ○ |
|  | Evaluation of bleed out |  |  | ○ | ○ |

TABLE 3

|  |  | Example 5 | Example 6 | Example 7 | Example 8 | Comparative Example 5 | Comparative Example 6 |
|---|---|---|---|---|---|---|---|
| Composition of sound insulation layer 1 | Polyvinyl butyral resin (Amount of acetyl groups: 13 mol %, degree of butyralization: 65 mol %, average degree of polymerization: 2100) | 100 | 100 | 100 | 100 | 100 | 100 |
|  | Plasticizer (3GO) | 30 | 20 | 80 | 45 | 43 | 94 |
| Composition of middle layer | Polyvinyl butyral resin (Amount of acetyl groups: 1 mol %, degree of butyralization: 65 mol %, average degree of polymerization: 1700) | 100 | 100 | 100 | 100 | 100 | 100 |
|  | Plasticizer (3GO) | 25 | 25 | 25 | 25 | 25 | 25 |
| Composition of sound insulation layer 2 | Polyvinyl butyral resin (Amount of acetyl groups: 13 mol %, degree of butyralization: 65 mol %, average degree of polymerization: 2100) | 100 | 100 | 100 | 100 | 100 | 100 |
|  | Plasticizer (3GO) | 60 | 60 | 20 | 40 | 40 | 30 |
| Difference in amount of acetyl groups in polyvinyl acetal resin in sound insulation layer 1 and middle layer (mol %) |  | 12 | 12 | 12 | 12 | 12 | 12 |
| Difference in amount of acetyl groups in polyvinyl acetal resin in sound insulation layer 2 and middle layer (mol %) |  | 12 | 12 | 12 | 12 | 12 | 12 |
| Difference in amount of plasticizer in sound insulation |  | 30 | 40 | 60 | 5 | 3 | 64 |

TABLE 3-continued

|  |  |  |  | Example 5 | Example 6 | Example 7 | Example 8 | Comparative Example 5 | Comparative Example 6 |
|---|---|---|---|---|---|---|---|---|---|
| layer 1 and sound insulation layer 2 (parts by weight) | | | | | | | | | |
| Evaluation | Sound insulation | Loss factor | 10° C. | 0.17 | 0.18 | 0.40 | 0.22 | 0.20 | 0.43 |
| | | | 20° C. | 0.48 | 0.44 | 0.33 | 0.25 | 0.23 | 0.33 |
| | | | 30° C. | 0.38 | 0.33 | 0.20 | 0.33 | 0.30 | 0.20 |
| | | | 40° C. | 0.27 | 0.28 | 0.24 | 0.26 | 0.20 | 0.21 |
| | | | 50° C. | 0.19 | 0.20 | 0.18 | 0.23 | 0.24 | 0.15 |
| | | | 60° C. | 0.15 | 0.16 | 0.15 | 0.22 | 0.22 | 0.12 |
| | | | Average | 0.273 | 0.265 | 0.250 | 0.252 | 0.232 | 0.240 |
| | | Evaluation | | ○ | ○ | ○ | ○ | X | X |
| | | Evaluation of penetration resistance | | ○ | ○ | ○ | ○ | ○ | ○ |
| | | Evaluation of bleed out | | ○ | ○ | ○ | ○ | ○ | ○ |

TABLE 4

|  |  | Example 9 | Example 10 | Example 11 | Example 12 | Comparative Example 7 | Comparative Example 8 |
|---|---|---|---|---|---|---|---|
| Composition of sound insulation layer 1 | Polyvinyl butyral resin (Amount of acetyl groups: 13 mol %, degree of butyralization: 65 mol %, average degree of polymerization: 2100) | 100 | 100 | 100 | 100 | 100 | 100 |
| | Plasticizer (3GO) | 30 | 20 | 80 | 45 | 43 | 94 |
| Composition of middle layer | Polyvinyl butyral resin (Amount of acetyl groups: 1 mol %, degree of butyralization: 65 mol %, average degree of polymerization: 1700) | 100 | 100 | 100 | 100 | 100 | 100 |
| | Plasticizer (3GO) | 50 | 50 | 50 | 50 | 50 | 50 |
| Composition of sound insulation layer 2 | Polyvinyl butyral resin (Amount of acetyl groups: 13 mol %, degree of butyralization: 65 mol %, average degree of polymerization: 2100) | 100 | 100 | 100 | 100 | 100 | 100 |
| | Plasticizer (3GO) | 60 | 60 | 20 | 40 | 40 | 30 |
| Difference in amount of acetyl groups in polyvinyl acetal resin in sound insulation layer 1 and middle layer (mol %) | | 12 | 12 | 12 | 12 | 12 | 12 |
| Difference in amount of acetyl groups in polyvinyl acetal resin in sound insulation layer 2 and middle layer (mol %) | | 12 | 12 | 12 | 12 | 12 | 12 |
| Difference in amount of plasticizer in sound insulation layer 1 and sound insulation layer 2 (parts by weight) | | 30 | 40 | 60 | 5 | 3 | 64 |
| Evaluation Sound insulation | Loss factor 10° C. | 0.18 | 0.19 | 0.38 | 0.21 | 0.20 | 0.38 |
| | 20° C. | 0.47 | 0.47 | 0.40 | 0.36 | 0.24 | 0.33 |
| | 30° C. | 0.42 | 0.40 | 0.30 | 0.45 | 0.40 | 0.28 |
| | 40° C. | 0.35 | 0.35 | 0.25 | 0.28 | 0.18 | 0.19 |
| | 50° C. | 0.10 | 0.12 | 0.12 | 0.12 | 0.12 | 0.12 |
| | 60° C. | 0.07 | 0.06 | 0.06 | 0.09 | 0.08 | 0.06 |
| | Average | 0.265 | 0.265 | 0.252 | 0.252 | 0.203 | 0.227 |
| Evaluation | | ○ | ○ | ○ | ○ | X | X |
| Evaluation of penetration resistance | | ○ | ○ | ○ | ○ | ○ | ○ |
| Evaluation of bleed out | | ○ | ○ | ○ | ○ | ○ | ○ |

TABLE 5

|  |  | Example 13 | Example 14 | Example 15 | Example 16 | Example 17 |
|---|---|---|---|---|---|---|
| Composition of sound insulation layer 1 | Polyvinyl butyral resin (Amount of acetyl groups: 6 mol %, degree of butyralization: 70 mol %, average degree of polymerization: 2300) | 100 | 100 | 100 | 100 | 100 |
| | Plasticizer (3GO) | 40 | 40 | 40 | 55 | 80 |
| Composition of middle layer | Polyvinyl butyral resin (Amount of acetyl groups: 1 mol %, degree of butyralization: 65 mol %, average degree of polymerization: 1700) | 100 | 100 | 100 | 100 | 100 |
| | Plasticizer (3GO) | 40 | 25 | 50 | 40 | 40 |

TABLE 5-continued

|  |  |  | Example 13 | Example 14 | Example 15 | Example 16 | Example 17 |
|---|---|---|---|---|---|---|---|
| Composition of sound insulation layer 2 | Polyvinyl butyral resin (Amount of acetyl groups: 6 mol %, degree of butyralization: 70 mol %, average degree of polymerization: 2300) | | 100 | 100 | 100 | 100 | 100 |
| | Plasticizer (3GO) | | 70 | 70 | 70 | 60 | 20 |
| Difference in amount of acetyl groups in polyvinyl acetal resin in sound insulation layer 1 and middle layer (mol %) | | | 5 | 5 | 5 | 5 | 5 |
| Difference in amount of acetyl groups in polyvinyl acetal resin in sound insulation layer 2 and middle layer (mol %) | | | 5 | 5 | 5 | 5 | 5 |
| Difference in amount of plasticizer in sound insulation layer 1 and sound insulation layer 2 (parts by weight) | | | 30 | 30 | 30 | 5 | 60 |
| Evaluation | Sound insulation | Loss factor 10° C. | 0.36 | 0.33 | 0.38 | 0.18 | 0.36 |
| | | 20° C. | 0.40 | 0.36 | 0.40 | 0.42 | 0.42 |
| | | 30° C. | 0.25 | 0.27 | 0.36 | 0.40 | 0.32 |
| | | 40° C. | 0.20 | 0.18 | 0.28 | 0.23 | 0.24 |
| | | 50° C. | 0.20 | 0.20 | 0.10 | 0.22 | 0.12 |
| | | 60° C. | 0.12 | 0.18 | 0.06 | 0.15 | 0.06 |
| | | Average | 0.255 | 0.253 | 0.263 | 0.267 | 0.253 |
| | | Evaluation | ○ | ○ | ○ | ○ | ○ |
| | Evaluation of penetration resistance | | ○ | ○ | ○ | ○ | ○ |
| | Evaluation of bleed out | | ○ | ○ | ○ | ○ | ○ |

TABLE 6

|  |  |  | Example 18 | Example 19 | Example 20 | Example 21 | Example 22 |
|---|---|---|---|---|---|---|---|
| Composition of sound insulation layer 1 | Polyvinyl butyral resin (Amount of acetyl groups: 6 mol %, degree of butyralization: 70 mol %, average degree of polymerization: 2300) | | 100 | 100 | 100 | 100 | 100 |
| | Plasticizer (3GO) | | 30 | 30 | 30 | 55 | 80 |
| Composition of middle layer | Polyvinyl butyral resin (Amount of acetyl groups: 1 mol %, degree of butyralization: 65 mol %, average degree of polymerization: 1700) | | 100 | 100 | 100 | 100 | 100 |
| | Plasticizer (3GO) | | 40 | 25 | 50 | 40 | 40 |
| Composition of sound insulation layer 2 | Polyvinyl butyral resin (Amount of acetyl groups: 13 mol %, degree of butyralization: 65 mol %, average degree of polymerization: 2100) | | 100 | 100 | 100 | 100 | 100 |
| | Plasticizer (3GO) | | 60 | 60 | 60 | 60 | 20 |
| Difference in amount of acetyl groups in polyvinyl acetal resin in sound insulation layer 1 and middle layer (mol %) | | | 5 | 5 | 5 | 5 | 5 |
| Difference in amount of acetyl groups in polyvinyl acetal resin in sound insulation layer 2 and middle layer (mol %) | | | 12 | 12 | 12 | 12 | 12 |
| Difference in amount of plasticizer in sound insulation layer 1 and sound insulation layer 2 (parts by weight) | | | 30 | 30 | 30 | 5 | 60 |
| Evaluation | Sound insulation | Loss factor 10° C. | 0.17 | 0.15 | 0.19 | 0.19 | 0.35 |
| | | 20° C. | 0.47 | 0.40 | 0.45 | 0.42 | 0.43 |
| | | 30° C. | 0.38 | 0.33 | 0.38 | 0.36 | 0.33 |
| | | 40° C. | 0.20 | 0.25 | 0.31 | 0.26 | 0.22 |
| | | 50° C. | 0.16 | 0.22 | 0.10 | 0.22 | 0.10 |
| | | 60° C. | 0.14 | 0.20 | 0.07 | 0.16 | 0.08 |
| | | Average | 0.253 | 0.258 | 0.250 | 0.268 | 0.252 |
| | | Evaluation | ○ | ○ | ○ | ○ | ○ |
| | Evaluation of penetration resistance | | ○ | ○ | ○ | ○ | ○ |
| | Evaluation of bleed out | | ○ | ○ | ○ | ○ | ○ |

TABLE 7

|  |  | Example 23 | Example 24 | Example 25 | Example 26 | Example 27 |
|---|---|---|---|---|---|---|
| Composition of sound insulation layer 1 | Polyvinyl butyral resin (Amount of acetyl groups: 21 mol %, degree of butyralization: 55 mol %, average degree of polymerization: 2300) | 100 | 100 | 100 | 100 | 100 |
| | Plasticizer (3GO) | 60 | 60 | 60 | 60 | 30 |
| Composition of middle layer | Polyvinyl butyral resin (Amount of acetyl groups: 1 mol %, degree of butyralization: 65 mol %, average degree of polymerization: 1700) | 100 | 100 | 100 | 100 | 100 |
| | Plasticizer (3GO) | 40 | 25 | 50 | 40 | 50 |

TABLE 7-continued

|  |  |  | Example 23 | Example 24 | Example 25 | Example 26 | Example 27 |
|---|---|---|---|---|---|---|---|
| Composition of sound insulation layer 2 | Polyvinyl butyral resin (Amount of acetyl groups: 13 mol %, degree of butyralization: 65 mol %, average degree of polymerization: 2100) |  | 100 | 100 | 100 | 100 | 100 |
|  | Plasticizer (3GO) |  | 30 | 30 | 30 | 55 | 90 |
| Difference in amount of acetyl groups in polyvinyl acetal resin in sound insulation layer 1 and middle layer (mol %) |  |  | 20 | 20 | 20 | 20 | 20 |
| Difference in amount of acetyl groups in polyvinyl acetal resin in sound insulation layer 2 and middle layer (mol %) |  |  | 12 | 12 | 12 | 12 | 12 |
| Difference in amount of plasticizer in sound insulation layer 1 and sound insulation layer 2 (parts by weight) |  |  | 30 | 30 | 30 | 5 | 60 |
| Evaluation | Sound insulation | Loss factor | 10° C. | 0.20 | 0.18 | 0.22 | 0.22 | 0.48 |
|  |  |  | 20° C. | 0.44 | 0.42 | 0.42 | 0.44 | 0.30 |
|  |  |  | 30° C. | 0.36 | 0.34 | 0.38 | 0.38 | 0.26 |
|  |  |  | 40° C. | 0.20 | 0.24 | 0.28 | 0.30 | 0.22 |
|  |  |  | 50° C. | 0.16 | 0.21 | 0.12 | 0.14 | 0.17 |
|  |  |  | 60° C. | 0.14 | 0.18 | 0.08 | 0.10 | 0.12 |
|  |  |  | Average | 0.250 | 0.262 | 0.250 | 0.263 | 0.258 |
|  |  | Evaluation |  | ○ | ○ | ○ | ○ | ○ |
|  | Evaluation of penetration resistance |  |  | ○ | ○ | ○ | ○ | ○ |
|  | Evaluation of bleed out |  |  | ○ | ○ | ○ | ○ | ○ |

TABLE 8

|  |  |  | Example 28 | Example 29 | Example 30 | Example 31 | Example 32 |
|---|---|---|---|---|---|---|---|
| Composition of sound insulation layer 1 | Polyvinyl butyral resin (Amount of acetyl groups: 21 mol %, degree of butyralization: 55 mol %, average degree of polymerization: 2700) |  | 100 | 100 | 100 | 100 | 100 |
|  | Plasticizer (3GO) |  | 30 | 30 | 30 | 70 | 80 |
| Composition of middle layer | Polyvinyl butyral resin (Amount of acetyl groups: 1 mol %, degree of butyralization: 65 mol %, average degree of polymerization: 1700) |  | 100 | 100 | 100 | 100 | 100 |
|  | Plasticizer (3GO) |  | 40 | 25 | 50 | 40 | 40 |
| Composition of sound insulation layer 2 | Polyvinyl butyral resin (Amount of acetyl groups: 21 mol %, degree of butyralization: 55 mol %, average degree of polymerization: 2700) |  | 100 | 100 | 100 | 100 | 100 |
|  | Plasticizer (3GO) |  | 70 | 70 | 70 | 65 | 20 |
| Difference in amount of acetyl groups in polyvinyl acetal resin in sound insulation layer 1 and middle layer (mol %) |  |  | 20 | 20 | 20 | 20 | 20 |
| Difference in amount of acetyl groups in polyvinyl acetal resin in sound insulation layer 2 and middle layer (mol %) |  |  | 20 | 20 | 20 | 20 | 20 |
| Difference in amount of plasticizer in sound insulation layer 1 and sound insulation layer 2 (parts by weight) |  |  | 40 | 40 | 40 | 5 | 60 |
| Evaluation | Sound insulation | Loss factor | 10° C. | 0.43 | 0.38 | 0.42 | 0.40 | 0.48 |
|  |  |  | 20° C. | 0.34 | 0.32 | 0.36 | 0.36 | 0.32 |
|  |  |  | 30° C. | 0.28 | 0.26 | 0.30 | 0.30 | 0.26 |
|  |  |  | 40° C. | 0.22 | 0.20 | 0.25 | 0.24 | 0.22 |
|  |  |  | 50° C. | 0.17 | 0.20 | 0.14 | 0.16 | 0.16 |
|  |  |  | 60° C. | 0.12 | 0.18 | 0.10 | 0.12 | 0.12 |
|  |  |  | Average | 0.260 | 0.257 | 0.262 | 0.263 | 0.260 |
|  |  | Evaluation |  | ○ | ○ | ○ | ○ | ○ |
|  | Evaluation of penetration resistance |  |  | ○ | ○ | ○ | ○ | ○ |
|  | Evaluation of bleed out |  |  | ○ | ○ | ○ | ○ | ○ |

TABLE 9

|  |  | Example 33 | Example 34 | Example 35 | Example 36 | Example 37 |
|---|---|---|---|---|---|---|
| Composition of sound insulation layer 1 | Polyvinyl butyral resin (Amount of acetyl groups: 13 mol %, degree of butyralization: 65 mol %, average degree of polymerization: 2100) | 100 | 100 | 100 | 100 | 100 |
|  | Plasticizer (3GO) | 60 | 70 | 60 | 70 | 80 |
| Composition of middle layer | Polyvinyl butyral resin (Amount of acetyl groups: 6 mol %, degree of butyralization: 70 mol %, average degree of polymerization: 2300) | 100 | 100 | 100 | 100 | 100 |
|  | Plasticizer (3GO) | 40 | 25 | 50 | 40 | 40 |

TABLE 9-continued

|  |  |  | Example 33 | Example 34 | Example 35 | Example 36 | Example 37 |
|---|---|---|---|---|---|---|---|
| Composition of sound insulation layer 2 | Polyvinyl butyral resin (Amount of acetyl groups: 13 mol %, degree of butyralization: 65 mol %, average degree of polymerization: 2100) |  | 100 | 100 | 100 | 100 | 100 |
|  | Plasticizer (3GO) |  | 20 | 30 | 20 | 65 | 20 |
| Difference in amount of acetyl groups in polyvinyl acetal resin in sound insulation layer 1 and middle layer (mol %) |  |  | 7 | 7 | 7 | 7 | 7 |
| Difference in amount of acetyl groups in polyvinyl acetal resin in sound insulation layer 2 and middle layer (mol %) |  |  | 7 | 7 | 7 | 7 | 7 |
| Difference in amount of plasticizer in sound insulation layer 1 and sound insulation layer 2 (parts by weight) |  |  | 40 | 40 | 40 | 5 | 60 |
| Evaluation | Sound insulation | Loss factor 10° C. | 0.18 | 0.25 | 0.18 | 0.28 | 0.36 |
|  |  | 20° C. | 0.45 | 0.40 | 0.42 | 0.45 | 0.40 |
|  |  | 30° C. | 0.38 | 0.32 | 0.38 | 0.38 | 0.32 |
|  |  | 40° C. | 0.28 | 0.26 | 0.28 | 0.22 | 0.24 |
|  |  | 50° C. | 0.15 | 0.20 | 0.14 | 0.12 | 0.16 |
|  |  | 60° C. | 0.10 | 0.16 | 0.10 | 0.08 | 0.11 |
|  |  | Average | 0.257 | 0.265 | 0.250 | 0.255 | 0.265 |
|  |  | Evaluation | ○ | ○ | ○ | ○ | ○ |
|  | Evaluation of penetration resistance |  | ○ | ○ | ○ | ○ | ○ |
|  | Evaluation of bleed out |  | ○ | ○ | ○ | ○ | ○ |

TABLE 10

|  |  |  | Example 38 | Example 39 | Example 40 | Example 41 | Example 42 |
|---|---|---|---|---|---|---|---|
| Composition of sound insulation layer 1 | Polyvinyl butyral resin (Amount of acetyl groups: 21 mol %, degree of butyralization: 55 mol %, average degree of polymerization: 2700) |  | 100 | 100 | 100 | 100 | 100 |
|  | Plasticizer (3GO) |  | 60 | 70 | 60 | 70 | 80 |
| Composition of middle layer | Polyvinyl butyral resin (Amount of acetyl groups: 6 mol %, degree of butyralization: 70 mol %, average degree of polymerization: 2300) |  | 100 | 100 | 100 | 100 | 100 |
|  | Plasticizer (3GO) |  | 40 | 25 | 50 | 40 | 40 |
| Composition of sound insulation layer 2 | Polyvinyl butyral resin (Amount of acetyl groups: 21 mol %, degree of butyralization: 55 mol %, average degree of polymerization: 2700) |  | 100 | 100 | 100 | 100 | 100 |
|  | Plasticizer (3GO) |  | 20 | 30 | 20 | 65 | 20 |
| Difference in amount of acetyl groups in polyvinyl acetal resin in sound insulation layer 1 and middle layer (mol %) |  |  | 15 | 15 | 15 | 15 | 15 |
| Difference in amount of acetyl groups in polyvinyl acetal resin in sound insulation layer 2 and middle layer (mol %) |  |  | 15 | 15 | 15 | 15 | 15 |
| Difference in amount of plasticizer in sound insulation layer 1 and sound insulation layer 2 (parts by weight) |  |  | 40 | 40 | 40 | 5 | 60 |
| Evaluation | Sound insulation | Loss factor 10° C. | 0.24 | 0.39 | 0.24 | 0.40 | 0.48 |
|  |  | 20° C. | 0.42 | 0.35 | 0.44 | 0.42 | 0.38 |
|  |  | 30° C. | 0.32 | 0.28 | 0.38 | 0.34 | 0.32 |
|  |  | 40° C. | 0.24 | 0.22 | 0.22 | 0.20 | 0.20 |
|  |  | 50° C. | 0.16 | 0.16 | 0.14 | 0.15 | 0.12 |
|  |  | 60° C. | 0.12 | 0.12 | 0.10 | 0.09 | 0.08 |
|  |  | Average | 0.250 | 0.250 | 0.253 | 0.267 | 0.263 |
|  |  | Evaluation | ○ | ○ | ○ | ○ | ○ |
|  | Evaluation of penetration resistance |  | ○ | ○ | ○ | ○ | ○ |
|  | Evaluation of bleed out |  | ○ | ○ | ○ | ○ | ○ |

TABLE 11

|  |  | Example 43 |
|---|---|---|
| Composition of surface protective layer 1 | Polyvinyl butyral resin (Amount of acetyl groups: 1 mol %, degree of butyralization: 65 mol %, average degree of polymerization: 1700) | 100 |
|  | Plasticizer (3GO) | 38 |
| Composition of sound insulation layer 1 | Polyvinyl butyral resin (Amount of acetyl groups: 6 mol %, degree of butyralization: 70 mol %, average degree of polymerization: 2300) | 100 |
|  | Plasticizer (3GO) | 55 |

TABLE 11-continued

|  |  |  | Example 43 |
|---|---|---|---|
| Composition of middle layer | Polyvinyl butyral resin (Amount of acetyl groups: 1 mol %, degree of butyralization: 65 mol %, average degree of polymerization: 1700) | | 100 |
| | Plasticizer (3GO) | | 40 |
| Composition of sound insulation layer 2 | Polyvinyl butyral resin (Amount of acetyl groups: 13 mol %, degree of butyralization: 65 mol %, average degree of polymerization: 2100) | | 100 |
| | Plasticizer (3GO) | | 60 |
| Composition of surface protective layer 2 | Polyvinyl butyral resin (Amount of acetyl groups: 1 mol %, degree of butyralization: 65 mol %, average degree of polymerization: 1700) | | 100 |
| | Plasticizer (3GO) | | 38 |
| Difference in amount of acetyl groups in polyvinyl acetal resin in sound insulation layer 1 and middle layer (mol %) | | | 5 |
| Difference in amount of acetyl groups in polyvinyl acetal resin in sound insulation layer 2 and middle layer (mol %) | | | 12 |
| Difference in amount of plasticizer in sound insulation layer 1 and sound insulation layer 2 (parts by weight) | | | 5 |
| Evaluation Sound insulation | Loss factor | 10° C. | 0.17 |
| | | 20° C. | 0.35 |
| | | 30° C. | 0.30 |
| | | 40° C. | 0.27 |
| | | 50° C. | 0.24 |
| | | 60° C. | 0.18 |
| | | Average | 0.252 |
| | Evaluation | | ○ |
| Evaluation of penetration resistance | | | ⊚ |
| Evaluation of bleed out | | | ⊚ |

TABLE 12

|  |  |  | Example 44 |
|---|---|---|---|
| Composition of surface protective layer 1 | Polyvinyl butyral resin (Amount of acetyl groups: 1 mol %, degree of butyralization: 65 mol %, average degree of polymerization: 1700) | | 100 |
| | Plasticizer (3GO) | | 38 |
| Composition of sound insulation layer 1 | Polyvinyl butyral resin (Amount of acetyl groups: 21 mol %, degree of butyralization: 55 mol %, average degree of polymerization: 2700) | | 100 |
| | Plasticizer (3GO) | | 30 |
| Composition of middle layer | Polyvinyl butyral resin (Amount of acetyl groups: 1 mol %, degree of butyralization: 65 mol %, average degree of polymerization: 1700) | | 100 |
| | Plasticizer (3GO) | | 50 |
| Composition of sound insulation layer 2 | Polyvinyl butyral resin (Amount of acetyl groups: 13 mol %, degree of butyralization: 65 mol %, average degree of polymerization: 2100) | | 100 |
| | Plasticizer (3GO) | | 90 |
| Composition of surface protective layer 2 | Polyvinyl butyral resin (Amount of acetyl groups: 1 mol %, degree of butyralization: 65 mol %, average degree of polymerization: 1700) | | 100 |
| | Plasticizer (3GO) | | 38 |
| Difference in amount of acetyl groups in polyvinyl acetal resin in sound insulation layer 1 and middle layer (mol %) | | | 20 |
| Difference in amount of acetyl groups in polyvinyl acetal resin in sound insulation layer 2 and middle layer (mol %) | | | 12 |
| Difference in amount of plasticizer in sound insulation layer 1 and sound insulation layer 2 (parts by weight) | | | 60 |
| Evaluation Sound insulation | Loss factor | 10° C. | 0.42 |
| | | 20° C. | 0.30 |
| | | 30° C. | 0.26 |
| | | 40° C. | 0.22 |
| | | 50° C. | 0.17 |
| | | 60° C. | 0.14 |
| | | Average | 0.252 |
| | Evaluation | | ○ |
| Evaluation of penetration resistance | | | ⊚ |
| Evaluation of bleed out | | | ⊚ |

TABLE 13

|  |  |  | Example 45 | Example 46 | Example 47 |
|---|---|---|---|---|---|
| Composition of surface protective layer 1 | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 38 | 38 | 38 |
| Composition of sound insulation layer 1 | Polyvinyl butyral resin (Amount of acetyl groups: 13 mol %, degree of butyralization: 65 mol %, average degree of polymerization: 2100) | | 100 | 100 | 100 |
| | Plasticizer (3GO) | | 30 | 30 | 30 |
| Composition of middle layer | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 40 | 25 | 50 |
| Composition of sound insulation layer 2 | Polyvinyl butyral resin (Amount of acetyl groups: 13 mol %, degree of butyralization: 65 mol %, average degree of polymerization: 2100) | | 100 | 100 | 100 |
| | Plasticizer (3GO) | | 60 | 60 | 60 |
| Composition of surface protective layer 2 | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 38 | 38 | 38 |
| Difference in amount of acetyl groups in polyvinyl acetal resin in sound insulation layer 1 and middle layer (mol %) | | | 12 | 12 | 12 |
| Difference in amount of acetyl groups in polyvinyl acetal resin in sound insulation layer 2 and middle layer (mol %) | | | 12 | 12 | 12 |
| Difference in amount of plasticizer in sound insulation layer 1 and sound insulation layer 2 (parts by weight) | | | 30 | 30 | 30 |
| Evaluation | Sound insulation | Loss factor | 10° C. | 0.16 | 0.16 | 0.18 |
| | | | 20° C. | 0.48 | 0.36 | 0.40 |
| | | | 30° C. | 0.35 | 0.36 | 0.36 |
| | | | 40° C. | 0.32 | 0.25 | 0.25 |
| | | | 50° C. | 0.14 | 0.21 | 0.19 |
| | | | 60° C. | 0.12 | 0.18 | 0.13 |
| | | | Average | 0.262 | 0.253 | 0.252 |
| | | Evaluation | | ○ | ○ | ○ |
| | Evaluation of penetration resistance | | | ◎ | ◎ | ◎ |
| | Evaluation of bleed out | | | ◎ | ◎ | ◎ |

TABLE 14

|  |  |  | Example 48 | Example 49 | Example 50 |
|---|---|---|---|---|---|
| Composition of surface protective layer 1 | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 38 | 38 | 38 |
| Composition of sound insulation layer 1 | Polyvinyl butyral resin (Amount of acetyl groups: 21 mol %, degree of butyralization: 55 mol %, average degree of polymerization: 2700) | | 100 | 100 | 100 |
| | Plasticizer (3GO) | | 30 | 30 | 30 |
| Composition of middle layer | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 40 | 25 | 50 |
| Composition of sound insulation layer 2 | Polyvinyl butyral resin (Amount of acetyl groups: 21 mol %, degree of butyralization: 55 mol %, average degree of polymerization: 2700) | | 100 | 100 | 100 |
| | Plasticizer (3GO) | | 70 | 70 | 70 |
| Composition of surface protective layer 2 | Polyvinyl butyral resin (Amount of acetyl groups: 1 mol %, degree of butyralization: 65 mol %, average degree of polymerization: 1700) | | 100 | 100 | 100 |
| | Plasticizer (3GO) | | 38 | 38 | 38 |
| Difference in amount of acetyl groups in polyvinyl acetal resin in sound insulation layer 1 and middle layer (mol %) | | | 20 | 20 | 20 |
| Difference in amount of acetyl groups in polyvinyl acetal resin in sound insulation layer 2 and middle layer (mol %) | | | 20 | 20 | 20 |
| Difference in amount of plasticizer in sound insulation layer 1 and sound insulation layer 2 (parts by weight) | | | 40 | 40 | 40 |
| Evaluation | Sound insulation | Loss factor | 10° C. | 0.33 | 0.36 | 0.38 |
| | | | 20° C. | 0.36 | 0.30 | 0.32 |
| | | | 30° C. | 0.36 | 0.24 | 0.30 |
| | | | 40° C. | 0.25 | 0.24 | 0.20 |
| | | | 50° C. | 0.20 | 0.22 | 0.18 |
| | | | 60° C. | 0.18 | 0.20 | 0.16 |
| | | | Average | 0.280 | 0.260 | 0.257 |
| | | Evaluation | | ○ | ○ | ○ |

| | Example 48 | Example 49 | Example 50 |
|---|---|---|---|
| Evaluation of penetration resistance | ⊚ | ⊚ | ⊚ |
| Evaluation of bleed out | ⊚ | ⊚ | ⊚ |

INDUSTRIAL APPLICABILITY

The present invention can provide the interlayer film for a laminated glass providing excellent overall sound insulation at temperatures in the wide range of from 10 to 60° C.

The invention claimed is:

1. An interlayer film for a laminated glass, comprising:
a sound insulation layer 1;
a middle layer; and
a sound insulation layer 2,
being laminated in this order,
wherein the sound insulation layer 1, the middle layer and the sound insulation layer 2 each contain a polyvinyl acetal resin and a plasticizer,
wherein:
an amount of the plasticizer per 100 parts by weight of the polyvinyl acetal resin in the sound insulation layer 1 is different by from 5 to 60 parts by weight from an amount of the plasticizer per 100 parts by weight of the polyvinyl acetal resin in the sound insulation layer 2,
the polyvinyl acetal resin contained in sound insulation layer 1 and sound insulation layer 2 contains only an acetal group having 4 carbon atoms as an acetal group, and
an amount of acetyl groups in the polyvinyl acetal resin contained in each of the sound insulation layer 1 and the sound insulation layer 2 is larger than an amount of acetyl groups in the polyvinyl acetal resin contained in the middle layer.

2. The interlayer film for a laminated glass according to claim 1,
wherein
the amount of the plasticizer per 100 parts by weight of the polyvinyl acetal resin in the sound insulation layer 1 is different by from 30 to 60 parts by weight from the amount of the plasticizer per 100 parts by weight of the polyvinyl acetal resin in the sound insulation layer 2.

3. The interlayer film for a laminated glass according to claim 1,
wherein
the amounts of the plasticizer per 100 parts by weight of the polyvinyl acetal resin in the sound insulation layer 1 and the sound insulation layer 2 each are from 20 to 90 parts by weight.

4. The interlayer film for a laminated glass according to claim 1,
wherein
at least one of the amount of the plasticizer per 100 parts by weight of the polyvinyl acetal resin in the sound insulation layer 1 and the amount of the plasticizer per 100 parts by weight of the polyvinyl acetal resin in the sound insulation layer 2 is larger than the amount of the plasticizer per 100 parts by weight of the polyvinyl acetal resin in the middle layer.

5. The interlayer film for a laminated glass according to claim 1,
wherein
the amounts of the acetyl groups in the polyvinyl acetal resin contained in the sound insulation layer 1 and the sound insulation layer 2 each are larger than the amount of the acetyl groups in the polyvinyl acetal resin contained in the middle layer by 5 mol % or more.

6. The interlayer film, for a laminated glass according to claim 1,
wherein,
the amounts of the acetyl, groups in the polyvinyl acetal resin contained in the sound insulation layer 1 and the sound insulation layer 2 each are 21 mol % or less.

7. The interlayer film for a laminated glass according to claim 1,
wherein
the amount of the acetyl groups in the polyvinyl acetal resin contained in the middle layer is 6 mol % or less.

8. The interlayer film for a laminated glass according to claim 1, further comprising
a surface protective layer 1 on the sound insulation layer 1 on a side opposite to the middle layer.

9. The interlayer film for a laminated glass according to claim 8,
wherein
the surface protective layer 1 contains a polyvinyl acetal resin that contains the acetyl groups in an amount less than the amount of the acetyl groups in the polyvinyl acetal resin contained in the sound insulation layer 1.

10. The interlayer film for a laminated glass according to claim 1, further comprising
a surface protective layer 2 on the sound insulation layer 2 on a side opposite to the middle layer.

11. The interlayer film for a laminated glass according to claim 10,
wherein
the surface protective layer 2 contains a polyvinyl acetal resin that contains the acetyl groups in an amount less than the amount of the acetyl groups in the polyvinyl acetal resin contained in the sound insulation layer 2.

12. The interlayer film for a laminated glass according to claim 1, further comprising
a surface protective layer 1 on the sound insulation layer 1 on a side opposite to the middle layer; and a surface protective layer 2 on the sound insulation layer 2 on a side opposite to the middle layer.

13. The interlayer film for a laminated glass according, to claim
wherein
the surface protective layer 1 contains a polyvinyl acetal resin that contains the acetyl groups in an amount less than the amount of the acetyl groups in the polyvinyl acetal resin contained in the sound insulation layer 1; and
the surface protective layer 2 contains a polyvinyl acetal resin that contains the acetyl groups in an amount less than the amount of the acetyl groups in the polyvinyl acetal resin contained in the sound insulation layer 2.

14. A laminated glass, comprising the interlayer film for a laminated glass according to claim 1 sandwiched between two transparent plates.

* * * * *